Nov. 18, 1969   H. H. AICHINGER   3,478,569
ELECTRONIC METHOD FOR RIGGING AIRPLANE CONTROL SURFACES
Filed Dec. 19, 1966   4 Sheets-Sheet 1

INVENTOR.
HARRY H. AICHINGER
BY
ATTORNEY

Nov. 18, 1969 H. H. AICHINGER 3,478,569
ELECTRONIC METHOD FOR RIGGING AIRPLANE CONTROL SURFACES
Filed Dec. 19, 1966 4 Sheets-Sheet 2
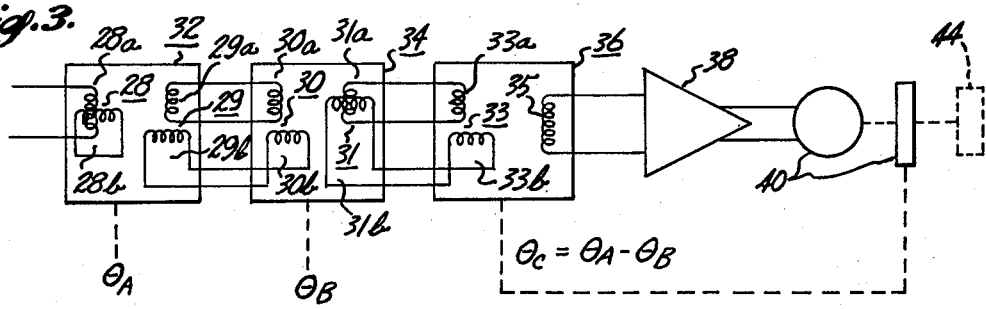
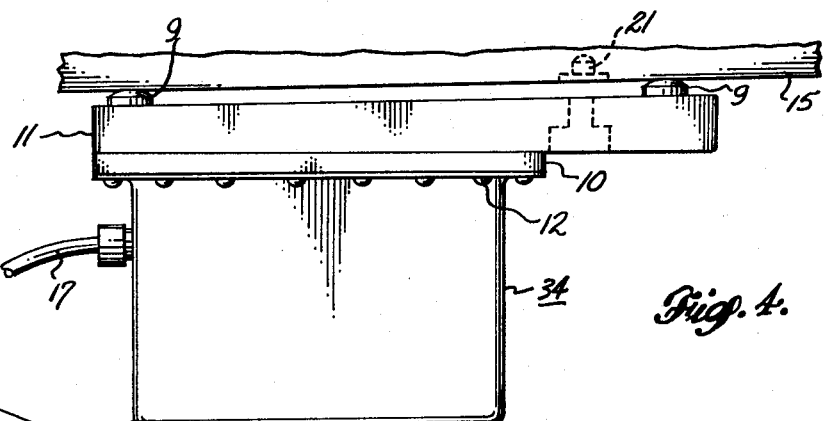
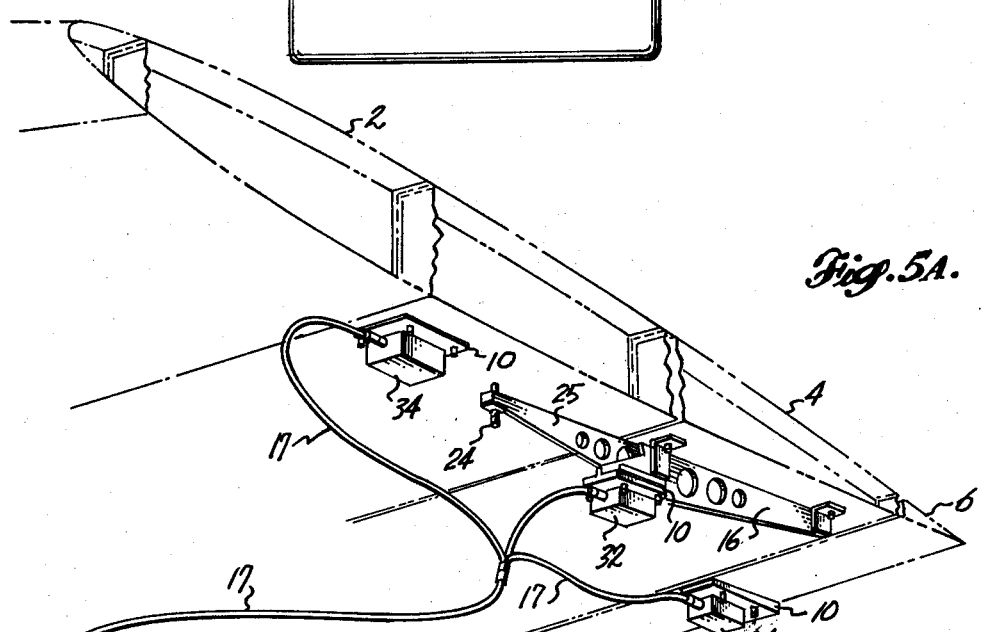
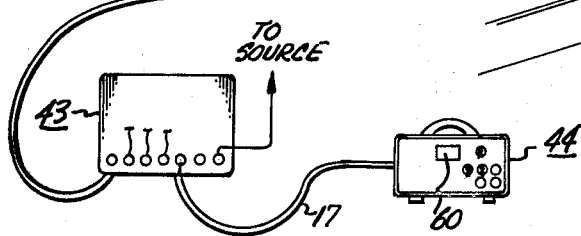
INVENTOR.
HARRY H. AICHINGER
BY
ATTORNEY Nov. 18, 1969   H. H. AICHINGER   3,478,569
ELECTRONIC METHOD FOR RIGGING AIRPLANE CONTROL SURFACES
Filed Dec. 19, 1966   4 Sheets-Sheet 3

INVENTOR.
HARRY H. AICHINGER
BY
ATTORNEY

Nov. 18, 1969     H. H. AICHINGER     3,478,569
ELECTRONIC METHOD FOR RIGGING AIRPLANE CONTROL SURFACES
Filed Dec. 19, 1966     4 Sheets-Sheet 4

INVENTOR.
HARRY H. AICHINGER
BY
ATTORNEY

United States Patent Office 3,478,569
Patented Nov. 18, 1969

3,478,569
ELECTRONIC METHOD FOR RIGGING AIRPLANE CONTROL SURFACES
Harry H. Aichinger, Bellevue, Wash., assignor to The Boeing Company, Seattle, Wash., a corporation of Delaware
Filed Dec. 19, 1966, Ser. No. 603,042
Int. Cl. G01c 25/00, 9/00; G01l 25/00
U.S. Cl. 73—1                                   2 Claims

ABSTRACT OF THE DISCLOSURE

A method for rigging the control surfaces of aircraft. The method utilizes pendulous resolver units connected to the control surfaces and the wing and which transmit electrical signals indicative of the angle of the surface and wing with respect to the true horizontal. The signals are resolved by an indicator which remotely indicates the angular relationship of the wing and control surface so that the controls of the wing may be calibrated.

---

The subject matter of this invention is related to copending patent application entitled "Electronic Method for Rigging Airplane Control Surfaces," Ser. No. 605,054, filed Dec. 27, 1966, in the name of Alfred Pletz, Jr., and assigned to the same assignee as is the subject application.

In the past, and at present, aircraft control surface rigging tools comprise large mechanical protractors or optical systems. Optical systems are undesirable from the standpoint of complexity and requirements of application within typical shop environments. The mechanical system has heretofore been satisfactory because of the relatively smaller size of the aircraft involved. As time progressed and aircraft became larger, the size of the mechanical protractor system became prohibitive and cumbersome. Additionally, since most of the control surface linkage adjustments are located on top of the control surfaces, a rigger using the mechanical protractor tool has to climb down from his scaffolding to read the protractor scale repeatedly, until alignment is obtained.

A feature of the teachings of this invention makes use of electronic devices to measure angular travel of control surfaces with respect to reference planes, find the zero or neutral positions of the control surfaces relative to the reference planes, and coordinate the operation of control surfaces with the aircraft control system. The basic application of this invention applies an electronic device, viz., a resolver, that emits an electrical signal which varies as the rotor of the resolver is rotated, in a manner described below, about its axis. Additional electronic equipment, described below, is used to compute the resolver input information into output data useful to the rigger. An electrical power source may be external to or emanate from the aircraft. In adjusting the control surfaces to a neutral or zero position, using electronic methods according to the teachings of this invention, all of the control surfaces are electronically aligned. Remote reading of control surface angle can be made by electrically switching to all of the control surface locations and electrically reading relative control surface angles directly. Presently, in using the mechanical beam protractor system or the optical system of control surface adjustments, readings must be made at individual control surfaces.

The advantages of the teachings of this invention are important. High accuracy in control surface alignment is obtainable. The readout instrument is portable and the reading of angular travel of control surfaces with respect to reference planes is available at a single location, by means of a selector switch, outside or inside the aircraft structure. Electrical attachments to the airplane are lightweight, easily installed and maintained. Inside structure attachments are independent of control surface contours. Such a feature becomes increasingly necessary with the advent of larger and more complex aircraft; accuracy of control surface alignment becomes critical with supersonic aircraft.

More specifically, the resolvers are electro-mechanical devices which are mounted on the control surfaces in a structural manner so that deviation of the control surfaces from a given plane will be reflected by an electrical signal generated by a resolver transformer commensurate with the amount of deviation. This signal is transmitted to a convenient location where appropriate readout apparatus, including a resolver transformer, is provided. Resolvers are used as the angle sensor units because of their inherent ruggedness and accuracy. Essentially, a resolver is a precision electromagnetic device composed of two rotor windings (rotating coil) and two stator windings (stationary coil) within accurately machined magnetic cores.

In accordance with the present invention, two types of pendulous resolver units are employed, each designed for a certain operation. These resolver units include a resolver differential and a resolver transmitter, defined more fully below with reference to the figures. Basically, the resolvers used for rigging wing and horizontal stabilizer control surfaces have a pendulous mass attached to their rotor. Gravitational pull upon the pendulum creates a reference plane for angular measurement. The pivotal action of the pendulum, as the control surface is moved, causes the rotor of the resolver to rotate about its axis, affecting the reluctance of the inductance within the resolver. The changing reluctance affects the coil current which, in turn, is employed to operate the readout equipment. For vertical control surfaces (i.e., the rudder) mechanical linkage type resolvers are used in place of pendulous resolvers.

It is an object of the teachings of this invention to provide an improved method for rigging the control surfaces of an aircraft.

It is another object of the teachings of this invention to provide a simple and economical method for rigging the control surfaces of an aircraft so that an electrical signal is generated in response to variations in the relative position of the control surfaces, wherein the electrical signal is suitable for transmission to a remote readout indicator.

A further object of the teachings of this invention is to provide a method whereby physically small and lightweight angle sensing devices may be employed for checkout tests of the control surfaces of an aircraft.

A still further object of the teachings of this invention is to provide a method for determining angular variations in the control surfaces of an aircraft and generating an electrical signal commensurate to the angular variation. The method employs sensing means which serve as a converter of mechanical deflections in aircraft control surfaces to electrical signals which are suitable for introduction to data reproduction equipment.

These features and objects are shown in the following description and drawings, wherein:

FIGURE 3 is a schematic representation of the electrical system layout according to the teachings of this invention;

FIGURE 4 shows a typical mounting arrangement for a differential resolver unit;

FIGURE 5A shows a typical control surface mounting arrangement for a transmitter resolver unit;

Figure 1A:
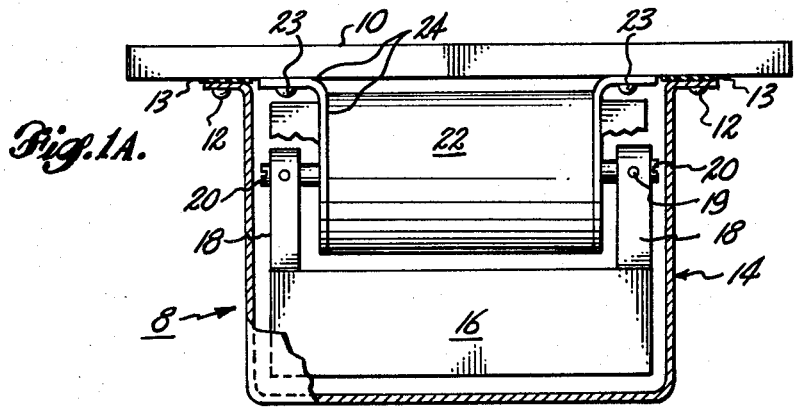
FIGURES 1A and 1B are section cutaways of a typical pendulous resolver unit.
Figure 1B:
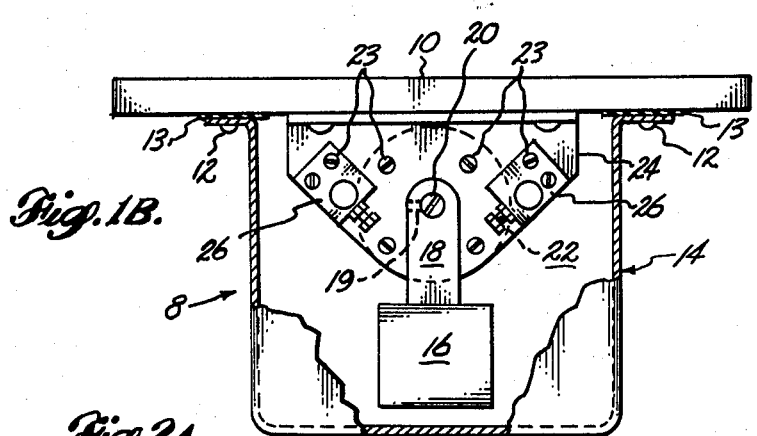

Referring to FIGURES 1A and 1B, a pendulous resolver 8 used for rigging horizontal control surfaces is shown affixed to a base plate 10 by bolt attachments 12 through gaskets 13. A resolver unit 22 is encased within a housing 14. A pendulum mass 16 is fixedly attached by its pendulum arm 18 and pins 19 to the rotor 20 of resolver 22. Resolver unit 22 is mounted within the housing 14 to the base plate 10 by screws 23 through a bracket mount 24. The swing of pendulum mass 16 is limited, for checking the angle readout accuracy of resolver unit 22, by adjustable stops 26, also attached to mount 24 by screws 23, as seen in FIGURE 1B. Damping of mass 16 is provided, if required, by a fluid which fills housing 14 to eliminate the effects of external vibrations on the readings.

Figure 2A:
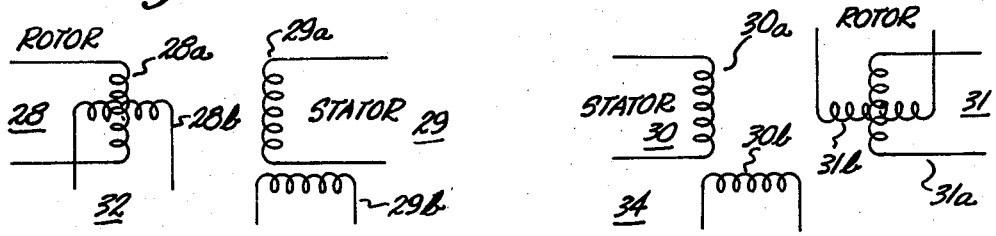
FIGURES 2A, 2B and 2C are schematic representations of: a resolver transmitter rotor and stator, a resolver differential rotor and stator, and a resolver control transformer rotor and stator, respectively.
Figure 2B:
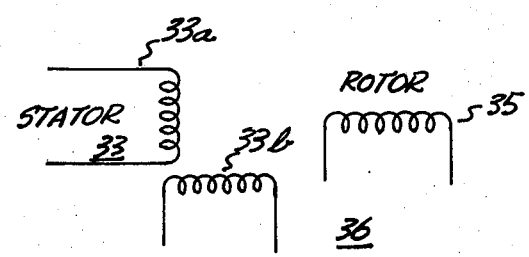
Figure 2C:
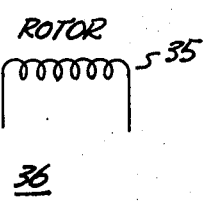

Referring to FIGURES 2A, 2B and 2C, schematic representations are shown of the two types of resolvers used for the electrical rigging system of this invention, and a resolver control transformer. In FIGURE 2A, a schematic representation is presented of a resolver transmitter unit 32. The resolver transmitter 32 has two perpendicular windings 28a and 28b forming its rotor or rotating coil 28. Since this invention will be described using only single phase voltage input on windings 28a, 28b is shown, in FIGURE 3, closed on itself to serve no function. Continuing, the transmitter 32 also has two perpendicular windings 29a and 29b forming its stator coil 29. Both rotor 28 and stator 29 are contained within accurately machined magnetic cores. The rotor 28 is positioned, in operation, by the pendulum 16 of FIGURES 1A and 1B for transmitting electrical information (through induction) which corresponds to the rotor 28 angular position with respect to the stator 29. The rotor 28 angular position varies due to movement of the pendulous mass 16, of FIGURES 1A and 1B, which seeks gravity to maintain its vertical axis even though the horizontal control surface (not shown) moves carrying with it the pendulous resolver 18 attached to the control surface by base plate 10. Whether any current is induced in windings 29a and 29b, by the voltage input to winding 28a, or not is dependent upon the angular relationship between the rotor 28 and the windings 29a and 29b. The amplitude of induced current in winding 29a equals the sine of the angular position of rotor 28 relative to winding 29a; the amplitude in winding 29b equaling the cosine of angular position of rotor 28 relative to winding 29b. For example, if rotor 28 has been aligned by pendulum 16 such that rotor 28 is parallel to winding 29a, no current will be induced in winding 29a since the sine of zero degrees is zero; maximum current will be induced in winding 29b.

As seen with reference to FIGURE 2B, a resolver differential 34, represented schematically, has two perpendicular windings 30a and 30b forming its stator 30 and 31a and 31b forming its rotor 31. The rotor 31 is mechanically positioned, by the pendulum 16 of FIGURES 1A and 1B, and as described above current will be induced in rotor 31 by stator 30 depending upon the angular position of rotor 31 relative to windings 30a and 30b.

With reference to FIGURE 2C, a schematic representation of a resolver control transformer 36 is illustrated. The transformer 36 has two perpendicular windings 33a and 33b forming its stator 33 and a single winding 35 serving as rotor. The amount of current induced in rotor winding 35 again is dependent upon the angular relationship between rotor 35 and stator windings 33a and 33b, described with reference now to FIGURE 3.

The electrical system schematic pertinent to control surface alignment is shown with reference to FIGURE 3. A resolver transmitter 32, a resolver differential 34, a resolver control transformer 36, an amplifier 38 and a servo motor 40 are shown. The transformer 36, amplifier 38 and servo 40 are integral parts of a readout device 44. One resolver transmitter 32 can be used with any desired and necessary number of resolver differentials 34. At the input to the resolver transmitter 32, a constant alternating voltage is applied to the rotor winding 28a which induces a current flow in stator windings 29a and 29b with amplitude depending upon rotor 28 angular position relative to windings 29a and 29b. This induced current flow is the output generated by transmitter 32 due to rotation of rotor 28 by pendulum 16 of transmitter 32. For convenience this electrical oput is designated $\theta_A$ which represents the angle, relative to a vertical plane created by the pendulum 16 of transmitter 32, to which the base plate 10 of resolver transmitter 32 has been tilted due to movement of the control surface X (not shown) to which transmitter 32 base plate 10 is attached.

Continuing, the current induced in stator windings 29a and 29b effects a flow of current to rotor windings 30a and 30b of the resolver differential 34. Similarly, induction of current to stator windings 31a and 31b of differential 34 will depend upon rotor 30 angular position relative to windings 31a and 31b. This latter induced current flow is, then, the output generated by differential 34 due to rotation of rotor 30 by pendulum 16 of differential 34. For convenience, this output is designated $\theta_B$ which represents the angle, relative to a vertical plane created by the pendulum 16 of differential 34, to which the base plate 10 of differential 34 has been tilted due to movement of the control surface Y (not shown) to which differential 34 base plate 10 is attached.

The current induced in the rotor 35 winding of transformer 36, due to the current output carried in windings 33a and 33b from differential 34, is fed through amplifier 38 whose output is converted to torque by a servomotor 40. The servo 40 turns the rotor 35 of transformer 36 a number of degrees, $\theta_C$, depending upon the amount of current induced in rotor winding 35. The amount of current so induced in winding 35 represents the current output difference between $\theta_A$ and $\theta_B$ and is presented as $\theta_C$, in terms of degrees, in the readout apparatus 44, shown by dotted lines in FIGURE 3, and to be described with reference to FIGURES 5D and 5E. Briefly, continuing with reference to FIGURE 3, the readout 44 converts the signal output from amplifier 38 into angular degrees, $\theta_C$. At the same time servomotor 40 rotates rotor 35 until a null point is reached, i.e., $\theta_C = \theta_A - \theta_B$ and current is no longer induced to rotor 35. Thus when control surface X (representing aileron 4 hereinafter) and control surface Y (representing wing 2 and/or tab 6 hereinafter) are rigged so that their engineering reference planes 5, seen in FIGURES 5B 5C below, are parallel and concurrent the base plate 10 of transmitter 32 and differential 34, respectively, are also parallel and $\theta_A$ equals $\theta_B$. This is the condition wherein all control surfaces have been rigged to neutral position; with $\theta_A$ equal to $\theta_B$, no current is induced in rotor winding 35 and $\theta_C$ equals zero. With a zero reading in the readout apparatus 44, the rigger knows that all control surfaces are rigged to neutral. As the control surfaces are subsequently pivoted about their hinge points during control surface checkout, $\theta_A$ will no longer equal $\theta_B$. Servo 40, in tracking to the null point, which is mathematically speaking $\theta_C = \theta_A - \theta_B$, rotates rotor 35 in transformer 36, and readout 44, also driven by the output from amplifier 38 which drives servo 40, automatically gives the relationship between control surfaces X and Y in terms of $\theta_C$.

With reference to FIGURES 1A, 1B and in conjunction with FIGURES 2A, 2B and 2C, the resolver unit 22 (transmitter or differential) is described more fully. The pendulum mass 16, as seen in FIGURES 1A and 1B, is attached to the rotor shaft 20 of the resolver unit 22. Gravitational force continually causes pendulum 16 to seek a vertical position as seen in FIGURE 1B. The pendulum 16 swings within container 14 as base plate 10 is tilted about rotor shaft 20. The base plate 10 is tilted due to movement of the horizontal control surfaces (not shown) to which plate 10 is attached. As pendulum 16 swings with rotor shaft 20, rotor shaft 20 is caused to rotate some angular number of degrees, ω, due to cotter pin 19 which pins pendulum 16 to rotor shaft 20. The rotation of rotor 20 generates a signal output as described above with reference to FIGURE 3. Damping fluid within container 14 quickly damps out normal pendulous oscillations and oscillations caused by external vibrations of the control surfaces.

Figure 5B:
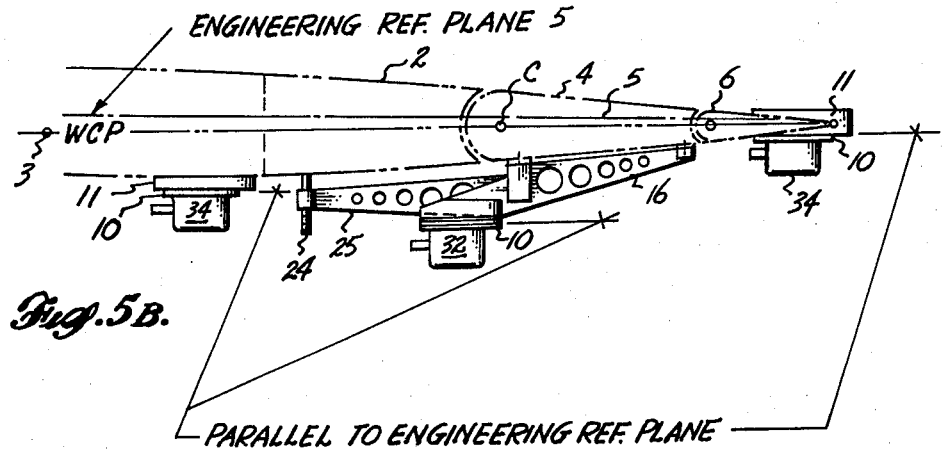
FIGURES 5B, 5C and 5D are schematic representations illustrating the electronic resolver units as applied to rigging air control surfaces and tabs according to the teachings of this invention.
Figure 5C:
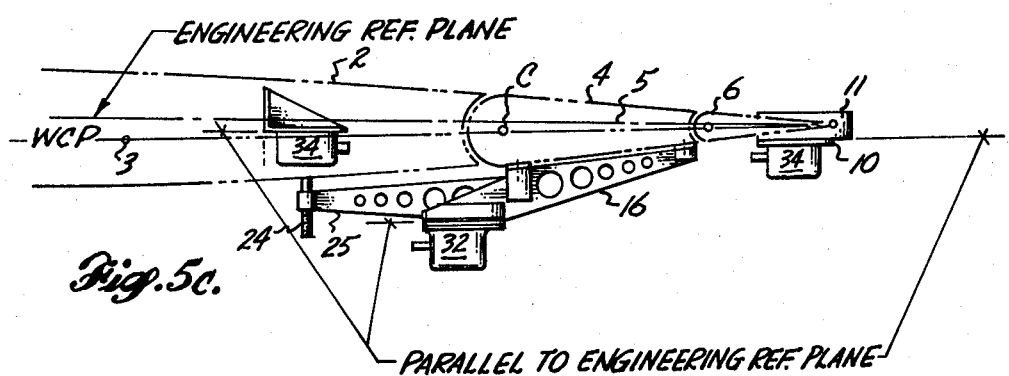
Figure 5D:
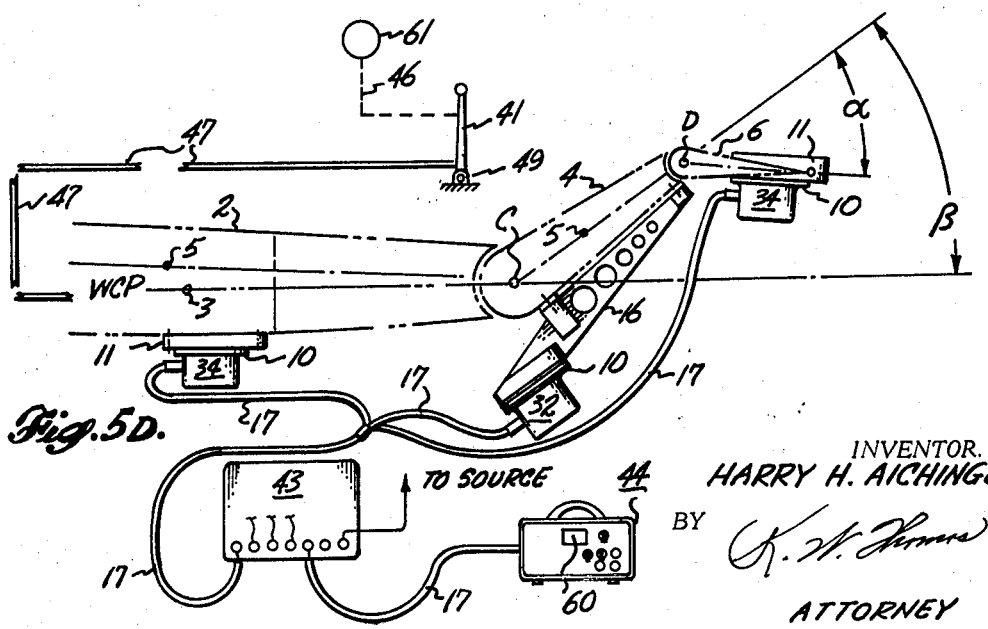

FIGURE 4 shows a typical mounting of a differential resolver 34 to a control surface of an aircraft, such as wing 2 and tab 6 of FIGURES 5B, 5C and 5D. A cable 17 electrically connects resolver 34 through a power panel 43 to a readout center 44 seen in FIGURE 5A. The resolver 34, with its base plate 10, is attached by bolts 12 to a mounting pad 11. The mounting pad 11 is attached to preselected fittings on the wing 2 of FIGURES 5B, 5C and 5D, shown in FIGURE 4 as wing or control surface 15, by bolt means 2. For attachment to tab 6 a clamp type mounting pad 11 is used. These same fittings could be located on internal airplane structure for readings independent of surface 15 contour or for in-flight use. In the case shown in FIGURE 4 the fittings are dimensionally controlled and selected as an aid to rigging so that when mounting pad 11 is mounted by bolts 21 with gage points 9 in contact with surface 15, base plate 10 will be parallel to engineering reference plane 5 as seen in FIGURES 5B and 5C.

With reference to FIGURE 5A, a mounting modification is used, for balance purposes, with respect to mounting a transmitter resolver unit 32 to the aileron 4. The transmitter 32 is attached, by base plate 10, to an attachment fitting 16. The fitting 16 is affixed to aileron 4 at a dimensionally controlled location. In this manner the transmitter resolver 32 base plate 10 is aligned parallel to the engineering reference plane 5 which, passing through aileron 4, constitutes aileron chord plane 5 as seen in FIGURES 5B, 5C and 5D. The fitting 16, as seen in FIGURE 5A, is designed to receive an adjustable stop fitting 25 for initial rigging. The fitting 25 has a screw adjustment 24 disposed to bias against the wing 2. By adjusting screw 24, a rigger can pivot aileron 4 about its hinge point C (seen in FIGURES 5B, 5C and 5D) with respect to the wing 2. This adjustment is made until the readout 44 of FIGURE 5A (to be described below) designates that aileron chord plane 5, seen in FIGURES 5B and 5C, has a predetermined position relative to the engineering reference plane 5 of wing 2. This readout is acquired as a function of the signal to the resolver control transformer 36 of FIGURE 3, of the readout 44 of FIGURE 5A, comprising in part the readout 44 of FIGURE 5A, which represents the difference between the readings of differential resolver 34 attached to wing 2 and transmitter resolver 32 attached to aileron 4 as seen in FIGURES 5B, 5C and 5D. This adjustment of aileron 4, performed by adjusmtent with screw 24, establishes a neutral position (described above) between the wing 2 and the aileron 4. The required position for the tab 6 of FIGURE 5A will be discussed with reference to FIGURES 5B, 5C and 5D below.

The resolver control transformer 36 and servo unit comprising an amplifier 38 and servomotor 40 (seen in the electrical schematic of FIGURE 3) are part of the readout instrument 44 of FIGURE 5A. The readout instrument 44 is connected, by cable 17 through power panel 43, with resolvers 32 and 34. The power panel 43 obtains power from either an electrical source (not shown) or from the aircraft itself. The power is converted into a voltage required by the resolvers and readout 44.

Referring to FIGURES 5B, 5C and 5D, a typical wing 2 with aileron 4 and tab 6 is shown. Differential resolvers, 34 are attached by their base plate 10 to mounting pads or attachments 11 on wing 2 and tab 6. A transmitter resolver 32 is attached by base plate 10 and fitting attachment 16 to control surface aileron 4. The adjustable and removable stop fitting 25 (for aileron adjustment only), having a screw adjustment 24, is connected to attachment 16 for initial rigging procedure. By adjusting screw 24, a rigger can move aileron 4 with respect to wing 2 about the hinge point C. The transmitter resolver 32 is balanced about hinge point C so as to produce a zero torque about hinge C. As discussed earlier with reference to FIGURE 5A, the differential resolver 34 base plate 10, attached to wing 2, has been attached so that base plate 10 is parallel to the engineering reference plane 5. A similar attachment connects a resolver 34 to tab 6. Similarly, the transmitter resolver 32 base plate 10, attached to aileron 4, is adjusted parallel to the engineering reference plane 5, which is coincident with aileron chord plane 5. The base plates 10 of all resolvers are now parallel to the engineering reference plane 5 of the individual control surfaces.

For control surface alignment to a neutral position, referring to FIGURES 5B and 5C, adjustment screw 24 on fitting 25 is adjusted to move aileron 4 with respect to wing 2. The angle which the aileron chord plane 5 (established initially to be the engineering reference plane 5) makes with respect to the engineering reference plane 5 of wing 2 will be shown in readout 44, FIGURE 5A, as a difference of two angles. The first angle, $\theta_A$, is produced by the resolver transmitter 32 attached to aileron 4; the second angle $\theta_B$, is produced by the resolver differential 34 attached to wing 2. The difference $\theta_A - \theta_B$ or angle $\theta_C$ is given by the resolver controlled transformer 36 which is an integral electrical part of readout 44. Readout 44, as shown in FIGURE 5A, is connected through power panel 43 and to the resolvers 32 and 34 by cable 17. Adjustment of screw 24 is made until readout 44 designates, in terms of $\theta_C$, that aileron chord plane 5 has a predetermined angular position relative to the engineering reference plane 5 of wing 2. As noted earlier, this indication in readout 44 is acquired as a signal from resolver 32 and resolver 34 to the transformer 36 representing the difference between $\theta_A$ and $\theta_B$. The tab 6 control surface is then aligned for neutral position with wing 2 and aileron 4 by manual movement or by linkage adjustment means (not shown) which are located on top of aileron 4. More particularly, the tab 6 is adjusted until its differential resolver 34, with transmitter resolver 32 on aileron 4, indicates base plate 10 is in the required position with respect to the engineering reference plane 5 of aileron 4. Thus $\theta_A$, the angle given by transmitter 32 attached to aileron 4 and $\theta_B$, the angle given by differential 34 attached to tab 6 have the relation $$\theta_A - \theta_B = 0 - \theta_C$$

as shown in readout 44. At this time the engineering reference plane of tab 6 is parallel and concurrent with the engineering reference plane of aileron 4, (i.e., aileron chord plane 5), and fitting 25 is removed from its support in attachment 16.

During the above neutral rigging step, the aircraft control surfaces are not interconnected; i.e., the interconnecting cables (not shown) are loose. After both wings on the aircraft have been adjusted separately so that the inboard and outboard control surfaces are aligned to a neutral position, they are interconnected by tightening the cables. The readout 44 can be used to quickly scan and make certain that all control surfaces, now interconnected, have remained aligned to neutral.

The control surfaces are now aligned for check-out tests by pilot control. Referring to FIGURE 5D, the angles of rotation, α and β, are measured in the following manner. The pilot control means include pilot control stick 41 and actuator 47 which, in response to movement of stick 41 about its pivot 49, rotates the control surfaces a number of degrees about their hinge points. The amount of control surface rotation is determined by the amount of pivot given stick 41 about pivot 49. The pendulum 16 (seen in FIGURES 1A and 1B), in transmitter resolver 32 seeks gravity as aileron 4 is rotated about hinge C. In so doing, pendulum 16 turns the rotor 20 (seen in FIGURES 1A and 1B) of transmitter 32 to induce an electrical output signal in rotor windings 30 as a function of angular movement $\theta_A$ (discussed with reference to FIGURES 3 and 1B above). This output is transmitted to the stator (not shown) of a differential resolver 34 whose rotor 20, as seen in FIGURE 1B, has similarly been positioned by its pendulum 16, as seen in FIGURE 1B, to induce a signal $\theta_B$. A resulting electrical output, $\theta_C = \theta_A - \theta_B$, from differential resolver 34 is transmitted, as discussed with reference to FIGURE 3, to readout 44 for automatic computation into relative angle information α or β. These angles, α and β, are read directly on the face of readout 44, on dial 60.

The fitting 16 in FIGURE 5D is used so that resolver 32 can be left in place during check-out tests of aileron 4, to insure zero torque about hinge C. As noted above, and seen in FIGURES 5B and 5C, removable fitting 25 is used for initial rigging only.

Figure 5E:
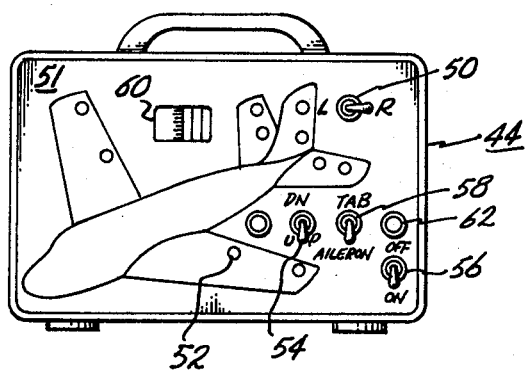
FIGURE 5E shows the readout apparatus according to the teachings of this invention.

Referring to FIGURES 5D and 5E, readout 44 is shown in detail. The readout 44, as seen also in FIGURE 5A, is connected by cables 17 through power panel 43 which provides voltage to readout 44 as well as to resolvers 32 and 34. The panel 43 also contains electric circuirty (not shown) which provides selection of rigging location readout as desired and as indicated by pilot lights 52 of FIGURE 5E on readout panel 44. Readout 44 consists of a small portable box containing a computer indicator dial 60 that converts electrical signals from transformer 36 into a dial reading of angular degrees. The panel 50 has an outline drawing of an airplane having pilot lights 52 located at each control surface rigging position and a switch 58 to allow the selection of the surface (aileron 4 or tab 6) to be read, a switch 54 for selection of the up or down angle, (i.e., α and β), and a switch 50 for selection of the left or right angle (rudder). The determination of left or right angle for the rudder has not yet been discussed. However, this angle is simply read as the angle between vertical planes and is read by using one transmitter resolver 32 (not shown) attached to the tail surface and a mechanical rudder linkage (not shown). Rotation movement of the rudder is thus transferred directly to the resolver 32 which sends electrical angular information to readout 44.

Referring to FIGURES 5D and 5E, in operation the teachings of this invention provide for checkout of control surfaces on an aircraft in the following manner. The readout panel 51 of FIGURE 5E is the front view of the readout unit 44. An airplane configuration is shown having pilot lights 52 located at all rigging locations. The entire system is "on" by switching 56 to the "on" position. By placing switch 54 to an "up" or "down" position as required and then switching 58 to "aileron" position, the rigger can proceed with his checkout of the aileron throw. At this time the readout 44 has been placed in the cockpit of the aircraft (not shown) where the control surfaces are checked out by moving them with the pilot control stick 41 and reading the angles of throw on indicator dial 60 associated with readout 44. When switch 54 is in the "up" position, the pilot control stick 41 is actuated to move the control surfaces in an upward (away from the ground) direction. A readout 61 receives an input with movement of stick 41 by means of a connection 46. The readout 61 provides an indication to the pilot of the number of degrees of rotation a particular control surface has undergone in response to actuation of stick 41. Once the pilot control stick 41 has been moved to a designated position, if the rigging for neutral position has been accurate, the resolvers 32 and 34 will provide with transformer 36 a reading on the angle indicator dial 60 of readout 44 corresponding to the reading on the pilot control stick readout 61. With switch 54 at the "up" position, the on-off switch 56 turned to the "on" position, and the tab-aileron switch 58 turned to the aileron position, the pilot control stick 41 is actuated to a certain number of degrees. Push button 62 is then pressed activating the circuitry (not shown) within panel 43 of FIGURES 5A and 5D which sequentially allows one of the lights 52 on readout 44 to light up and an angle to be shown in angle indicator dial 60 for the particular area designated by each of the lights 52 as they are sequentially illuminated. Thus, beginning for example with the outboard light 52 on the left wing of the aircraft, the angle indicator dial 60 will read the number of degrees α or β, as given by resolvers 32 and 34, to which the aileron chord plane 5 of FIGURE 5D has been elevated with respect to the engineering reference plane 5. The lights 52 continue to advance and illuminate sequentially under control of panel 43 circuitry to give readings on the angle indicator dial 60 of the outboard aileron on the left wing, then the inboard aileron on the left wing, the outboard aileron of the right wing and then the inboard aileron on the right wing. α and β are directly shown by indicator 60; if the neutral setting of the control surfaces was correct and aircraft power linkages are operating properly, the angle shown by indicator 60 should correspond to the angle shown on the aircraft pilot control readout 61. By moving switch 58 of FIGURE 5D to the tab position, α is given at indicator 60 by signal inputs from transmitter resolver 32, attached to aileron 4 and differential resolver 34, attached to tab 6. These angles given by readout 44 indicator 60 can then be compared with the angles given by the pilot control readout 61 as with the aileron throw check.

I claim:
1. A method of rigging and measuring the angular travel of at least one control surface of an aircraft with respect to said aircraft, comprising the steps of:
   (a) attaching a first electrical pendulous angle responsive means to said control surface to indicate the angular position of said control surface with respect to ambient gravity,
   (b) attaching a second electrical pendulous angle responsive means at a predetermined location on a portion of said aircraft other than on said control surface, to indicate the angular position of said aircraft portion with respect to ambient gravity,
   (c) connecting said first and second electrical pendulous angle responsive means to a readout unit,
   (d) adjusting said control surface until the readout unit responding to electrical signal inputs from said first and second responsive means indicate said control surface has a predetermined relationship with respect to said aircraft portion,
   (e) rotating said control surface through a series of angular positions relative to said aircraft, and
   (f) monitoring the readout unit indication of control surface angular position.

2. The method as recited in claim 1, wherein said aircraft has pilot control means to move said control surface, and pilot indicator means to indicate the angular position of said control surface, and said control surface is moved by said pilot control means, and said readout unit indications are monitored with respect to said pilot indicator means.

References Cited

UNITED STATES PATENTS

| | | | |
|---|---|---|---|
| 2,170,824 | 8/1939 | Liahtenwalner. | |
| 1,669,380 | 5/1928 | Milburn | 33—207 X |
| 2,620,391 | 12/1952 | King | 340—27 |
| 3,295,219 | 1/1967 | Stockton et al. | 33—206 |
| 3,328,881 | 7/1967 | Iddings. | |

S. CLEMENT SWISHER, Primary Examiner

U.S. Cl. X.R.

33—206, 207; 340—27